United States Patent [19]

Barnes et al.

[11] Patent Number: 5,564,391
[45] Date of Patent: Oct. 15, 1996

[54] ELECTRONIC CONTROL FOR A HYDRAULIC-ACTUATOR UNIT INJECTOR FUEL SYSTEM AND METHOD FOR OPERATING SAME

[75] Inventors: Travis E. Barnes; Mark E. Rettig; Mark J. Hilbert, all of Peoria, Ill.

[73] Assignee: Caterpillar Inc., Peoria, Ill.

[21] Appl. No.: 78,525

[22] Filed: Jun. 16, 1993

[51] Int. Cl.⁶ .................................................. F02M 7/00
[52] U.S. Cl. .......................................... 123/446; 123/500
[58] Field of Search ................................ 123/446, 381, 123/357, 358, 359, 500, 501

[56] References Cited

U.S. PATENT DOCUMENTS

| | | | |
|---|---|---|---|
| 4,248,194 | 2/1981 | Drutchas | 123/497 |
| 4,825,373 | 4/1989 | Nakamura | 123/501 |
| 4,982,331 | 1/1991 | Miyazaki | 123/497 |
| 5,168,855 | 12/1992 | Stone | 123/446 |
| 5,181,494 | 1/1993 | Ausman | 123/446 |
| 5,191,867 | 3/1993 | Glassey | 123/446 |

Primary Examiner—Carl S. Miller
Attorney, Agent, or Firm—R. Carl Wilbur

[57] ABSTRACT

An apparatus and method for sampling the pressure of a hydraulic actuator fluid used in connection with an electronically controlled hydraulic actuator unit injector fuel system is disclosed. The apparatus and method eliminates aliasing and other sampling errors caused by oscillations in the hydraulic actuator fluid pressure. The apparatus and method senses an engine parameter to permit an electronic controller to calculate an injection time and duration for fuel to be delivered to a particular cylinder. The electronic controller issues a driver signal to a hydraulically actuated unit fuel injector. A hydraulic actuator fluid pressure sensor is associated with the pressurized hydraulic actuator fluid. The electronic controller samples the hydraulic actuator fluid pressure sensor in dependence on the issuance of the driver signal.

20 Claims, 3 Drawing Sheets

Fig_2_

5,564,391

ELECTRONIC CONTROL FOR A HYDRAULIC-ACTUATOR UNIT INJECTOR FUEL SYSTEM AND METHOD FOR OPERATING SAME

TECHNICAL FIELD OF THE INVENTION

The present invention relates generally to hydraulically actuated electronically controlled fuel injection, and more particularly, to an electronic control for sensing rail pressure of pressurized hydraulic actuator fluid.

1. Background Art

An example of a hydraulically actuated electronically controlled unit injector fuel system is shown in U.S. Pat. No. 5,191,867 issued to Glassey on Mar. 9, 1993. The Glassey patent discloses a system for accurately controlling the pressure of the pressurized hydraulic actuator fluid. Systems prior to the Glassey patent were unable to maintain a desired pressure of the pressurized hydraulic actuator fluid due to variations in operation of certain components in the hydraulic circuit. For example, the hydraulic pump of those prior systems normally exhibits a variation in pumping efficiency according to the speed of the engine. The Glassey patent discloses a system that more accurately controls the pressure of the pressurized hydraulic actuator fluid.

However, neither the device disclosed in the Glassey patent nor other prior art systems measure oscillations in rail pressure. Those oscillations can cause the amount of fuel injected into an individual cylinder to deviate from the desired amount of fuel, potentially causing decreased performance, excess emissions and other undesirable effects.

It would be desirable to develop an electronic control that is able to measure oscillations in the rail pressure of the hydraulic actuator fluid, thereby permitting more accurate control of the fuel injection.

The present invention is directed toward overcoming one or more of the above-described problems.

2. Disclosure of the Invention

In one aspect of the present invention, a hydraulically actuated electronically controlled unit injector fuel system is disclosed. That system includes a hydraulically actuated electronically controlled fuel injector connected to a pressurized hydraulic actuator fluid source. A sensor is associated with the hydraulic actuator fluid and is electrically connected to an electronic controller. The electronic controller produces an injection signal and inputs the hydraulic actuator fluid pressure signal at times that are a function of the injection signal.

In another aspect of the present invention, a method for sensing an oscillation in pressure of a hydraulic actuator fluid in a hydraulically actuated electronically controlled unit injector fuel system is disclosed including the steps of issuing an injection signal and sensing the actuator fluid in response to issuing said injection signal.

Other aspects and advantages of the present invention will become apparent upon reading the detailed description in connection with the drawings and appended claims.

DETAILED DESCRIPTION OF A PREFERRED EMBODIMENT

The present invention relates to an electronic control system for use in connection with a hydraulically actuated electronically controlled unit injector fuel system. Hydraulically actuated electronically controlled unit injector fuel systems are known in the art. One example of such a system is shown in U.S. Pat. No. 5,191,867, issued to Glassey on Mar. 9, 1993, the disclosure of which is incorporated herein by reference.

Figure 1:
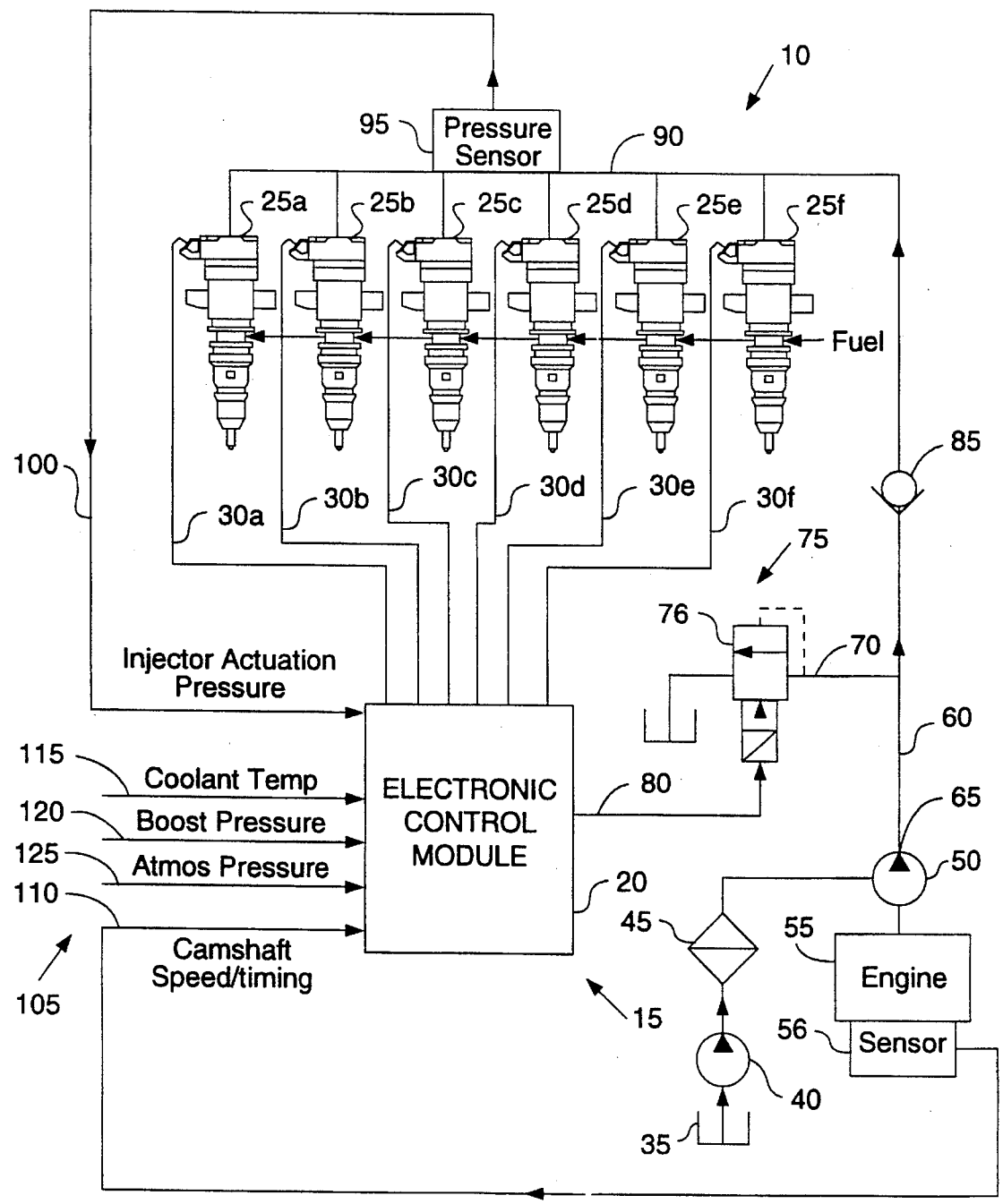
FIG. 1 illustrates in block diagram form a preferred embodiment of the control system of the present invention.

Throughout the specification and figures, like reference numerals refer to like components or parts. Referring first to FIG. 1, a preferred embodiment of the electronic control system 10 for a hydraulically actuated electronically controlled unit injector fuel system is shown. The control system includes an electronic controller 15, which in the preferred embodiment is a microcontroller 20. The microcontroller 20 used in the preferred embodiment is a Motorolla microcontroller, model no. 68HC11. However, many suitable controllers may be used in connection with the present invention as would be known to one skilled in the art.

The electronic control system 10 includes hydraulically actuated electronically controlled unit injectors 25a–f which are individually connected to outputs of the controller 20 by electrical connectors 30a–f respectively. In FIG. 1, six such unit injectors 25a–f are shown illustrating the use of the electronic control system 10 with a six cylinder engine 55. However, the present invention is not limited to use in connection with a six cylinder engine. To the contrary, it may be easily modified for use with an engine having any number of cylinders and unit injectors 25. Each of the unit injectors 25a–f is associated with an engine cylinder as is known in the art. Thus, to modify the preferred embodiment for operation with an eight cylinder engine would require two additional unit injectors 25 for a total of eight such injectors 25.

Hydraulic actuator fluid is required to provide sufficient pressure to cause the unit injectors 25 to open and inject fuel into an engine cylinder. In a preferred embodiment the hydraulic actuator fluid comprises engine oil and the oil supply is the engine oil pan 35. Low pressure oil is pumped from the oil pan by a low pressure pump 40 through a filter 45, which filters impurities from the engine oil. The filter 45 is connected to a high pressure fixed displacement supply pump 50 which is mechanically linked to, and driven by, the engine 55. High pressure hydraulic actuator fluid (in the preferred embodiment, engine oil) enters the conduit 60 connected to the output 65 of the high pressure supply pump 50. One end of the conduit 70 is connected to the conduit 60 and the opposite end is connected to an injector actuation controller 75. The actuation controller 75 and the fixed displacement pump 50 are shown as distinct components. However, a single component including both features could be readily and easily substituted. Such components are well known in the art.

In a preferred embodiment, the injector actuation controller 75 comprises the fixed displacement pump 50 connected to an injector actuation control valve 76. Other devices, which are well known in the art, may be readily and easily substituted for the fixed displacement pump 50 and the injector actuation control valve 76. For example, one such device includes a variable pressure high displacement pump.

In a preferred embodiment, the combination of the control valve 76 and the fixed displacement pump 50 permits the microcontroller 20 to maintain a desired pressure of hydraulic actuator fluid in the conduits 70, 60, 90. The injector actuation control valve 76 is connected to the microcontroller 20 by an electrical connector 80. An injector actuation pressure sensor 95 is associated with the conduit 90 and produces an output signal over the electrical connector 100 connected to the microcontroller 20. The microcontroller 20 maintains closed loop control over the pressure of the hydraulic actuator fluid in conduit 90, in part, by sampling the output signal on connector 100 of the pressure sensor 95.

The microcontroller 20 calculates a desired hydraulic actuator pressure as a function of engine speed, desired amount of fuel to be injected, and other engine parameters. The calculation of a specific desired hydraulic actuator pressure is beyond the scope of the present invention and is not further discussed. In a preferred embodiment, the desired hydraulic actuator pressure is between 5 MPa to 23 MPa, although other pressures may also be used.

The hydraulic actuator pressure in the conduit 90 supplying the unit injectors 25a–f is a function of the signal sent by the microcontroller 20 to the control valve 76 over connector 80. As noted above, the controller implements a closed loop control of the hydraulic actuator pressure. Thus as is known in the art, the signal sent by the microcontroller 20 over connector 80 to the injector actuation control valve 76 is a difference signal that is a function of the difference between the desired hydraulic actuator pressure, as calculated by the microcontroller 20, and the feedback signal from the pressure sensor 95 over connector 100. Because the pressure sensor is used to close the loop controlling the hydraulic actuator pressure, it is important that sampling of the pressure sensor 95 by the microcontroller 20 eliminate sampling errors that might result from oscillations in the hydraulic actuator pressure. Those sampling errors could result in an erroneous difference signal which could prevent the microcontroller 20 from maintaining a desired hydraulic actuator pressure and controlling fuel delivered to the engine cylinders. As is more fully described below, the present invention eliminates such errors.

A check valve 85 is connected to the conduit 60, 90. An injector actuation pressure sensor 95 is associated with the conduit 90 and produces an output signal over the electrical connector 100 connected to the microcontroller 20. The microcontroller 20 also receives other sensor signals 105 indicative of engine operating parameters. For example, in a preferred embodiment of the present invention, a camshaft speed timing signal 110 is an input to the microcontroller 20 from the camshaft speed/timing sensor 56 associated with the engine. Also provided as inputs to the microcontroller 20 may be signals such as coolant temperature 115 from a coolant temperature sensor, boost pressure 120 from a boost pressure sensor, and atmospheric pressure 125 from an atmospheric pressure sensor. The sensors for these signals are not shown in FIG. 1. However, the use of such sensors in connection with an engine is well known in the art. One skilled in the art could easily and readily implement such sensors in connection with an engine using the present invention.

As is more fully explained in the Glassey patent, the quantity of fuel injected by a unit injector 25a–f into a specific engine cylinder is a function of the individual driver signal delivered to the injector 25 by the microcontroller 20 over the respective electrical connector 30a–f and the pressure of the hydraulic actuator fluid in the conduit 90.

For example, the microcontroller 20 typically calculates the amount of fuel required to be injected into a specific engine cylinder according to certain sensed parameters including engine speed 110, boost pressure 125 and other signals as is known to those skilled in the art. Such calculations are specific to the particular engine on which the invention is utilized and are known to those skilled in the art. The present invention does not relate to the calculation of the amount of fuel to be delivered but instead to insuring that the controller 20 receives an accurate measure of the hydraulic actuator fluid pressure in conduit 90 so that it can accurately calculate the driver signal necessary to cause the unit injector 25 to deliver the required amount of fuel. Thus, the specific calculations for determining the required amount of fuel will not be further discussed.

To calculate the required unit injector driver signal corresponding to the required amount of fuel, the microcontroller 20 must measure the pressure of the hydraulic actuator fluid in the conduit 90. In prior hydraulically actuated electronically controlled unit injector fuel systems, the microcontroller 20 measured a filtered or averaged pressure signal in an attempt to filter out transient fluctuations in the hydraulic actuator pressure. However, experimentation has shown that those transient fluctuations can sometimes be significant. In those prior art systems, the microcontroller 20 issues an injection signal based on a sensed average injector actuation pressure, when in fact, because of transient fluctuations, the actual injector actuation pressure is more or less than that value. Because the actual pressure is different from the sensed pressure, the calculated injection signal for such systems will be incorrect, causing more or less than the calculated desired amount of fuel to be injected into the cylinder.

Empirical testing has shown that a transient pressure wave is established in conduit 90, and the period of the pressure wave is a function of the engine speed. More specifically, it has been determined that the transient pressure wave is caused by the firing of the individual unit injectors 25a–f. Thus, the frequency of the pressure wave is a function of the speed at which the individual unit injectors 25 open. In the figures, a six cylinder four cycle engine is shown. In such an engine 55, three injectors 25 open and close during each engine revolution. The frequency of the transient pressure wave is therefore three times the engine speed. For example, if a six cylinder engine is rotating at 1800 RPM (30 rev/s) the frequency of the transient pressure wave is approximately 90 Hz. Similarly, in an eight cylinder four cycle engine, there are four injectors 25 opening and closing during each engine revolution. The transient pressure wave therefore has a frequency of about four times the engine speed. Although the preferred embodiment is discussed with respect to a four cycle engine, one skilled in the art could readily and easily implement the present invention in connection with a two cycle engine. As is known to those skilled in the art, in a six cylinder two cycle engine all six injectors open and close during an engine revolution. Thus, the frequency of the pressure wave would be six times the speed of that engine.

As is known in the art, the Nyquist frequency of a signal determines the theoretical minimum frequency at which a signal must be sampled in order to reproduce that signal. In theory, it is necessary to sample at twice the frequency of the signal to reproduce that signal. However, in practice the sampling frequency must be at least four or five times greater than the frequency of the signal being sampled in order to reasonably reproduce that signal. However, because the microcontroller 20 must perform tasks other than repeatedly monitoring the injector actuation sensor 95, it is often impossible to sample the injector actuation signal fast enough to reasonably reproduce the transient pressure wave.

Figure 2:
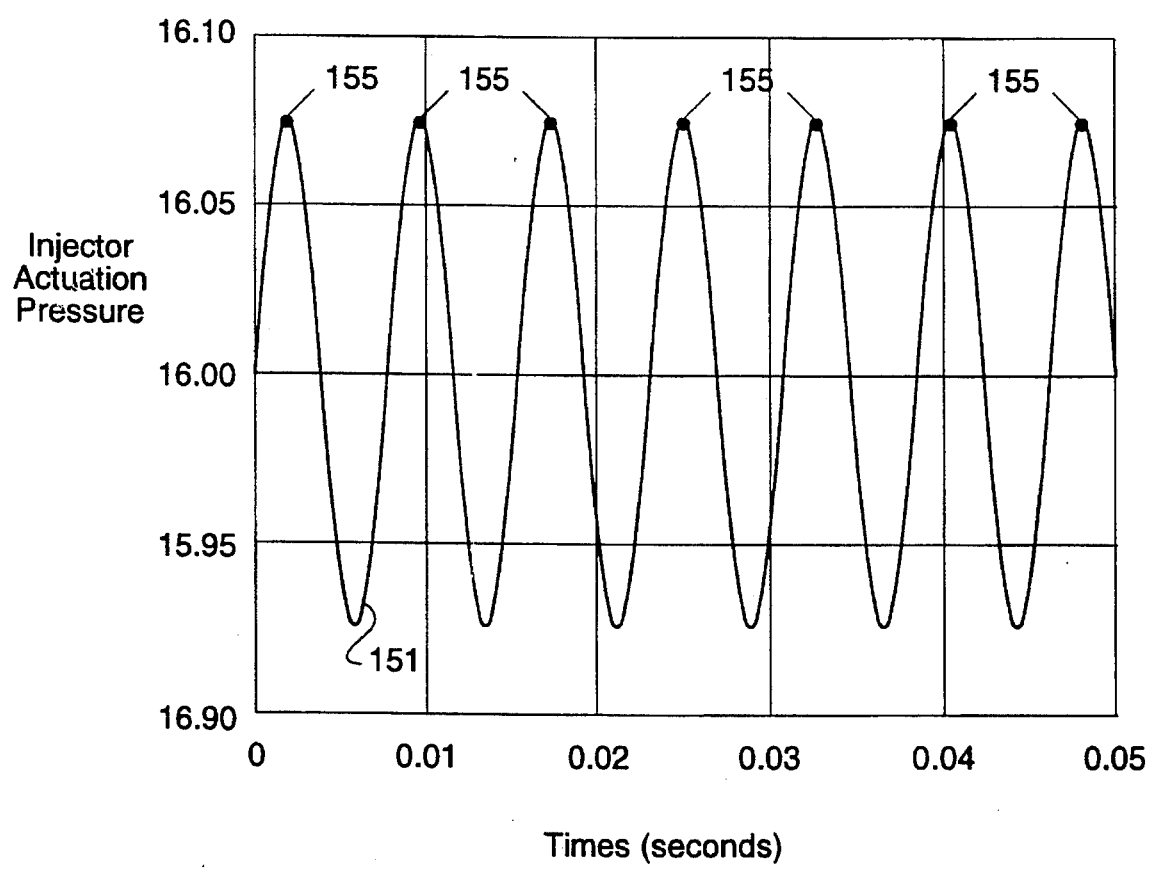
FIG. 2 graphically illustrates the rail pressure sampling of a preferred embodiment of the present invention.

FIG. 2 generally illustrates the transient pressure wave 151 established in conduit 90 when the engine 55 is operating at approximately 2600 RPM and the injector actuation control valve 76 has established a steady state hydraulic actuator fluid pressure of approximately 16 MPa. As can be seen from the figure, the transient pressure wave 151 is periodic. As noted above, the oscillations in the hydraulic actuator pressure are caused by the firing of the individual unit injectors 25a–f. Thus, the frequency of the wave is a function of the firing of the injectors 25a–f which in turn is a function of engine speed.

The preferred embodiment of the present invention causes the microcontroller 20 to sample the injector actuation pressure sensor 95 at the points 155. Those points 155 correspond to the time when the microcontroller 20 initiates the start of a driver signal to a specific unit injector 25a–f over a corresponding connector 30a–f. In this manner, the microcontroller 20 reads the injector actuation pressure sensor 95 at the same point of each cycle on the periodic transient pressure wave 151. As shown in FIG. 2, the transient pressure wave is measured at a peak of each cycle 155. Although the pressure deceases from that peak 155 throughout the remainder of the injection cycle, the decrease can be predicted from the graph shown in FIG. 2. By being able to predict the hydraulic actuator pressure in conduit 90 throughout the injection cycle, the microcontroller 20 can accurately calculate the time period that the unit injector 25 must be on.

Figure 3:
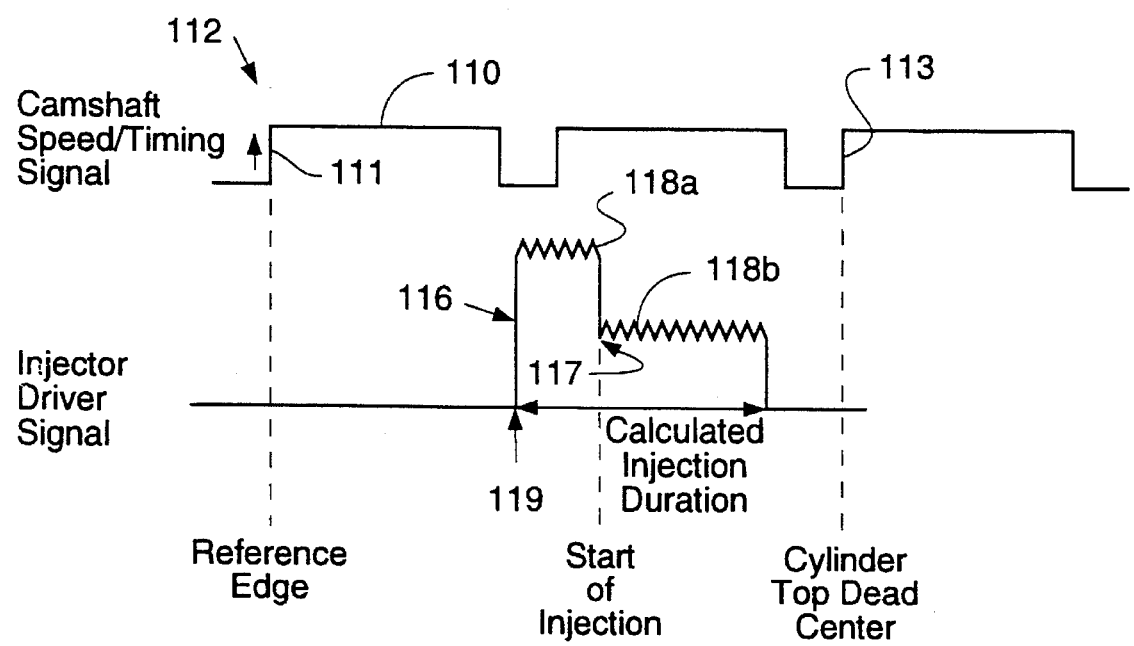
FIG. 3 illustrates a timing diagram of the signals generated by a preferred embodiment of the electronic control of the present invention.

The microcontroller 20 then issues a driver signal to the specific unit injector 25 over the respective connector 30 which will cause the unit injector 25 to be on for the required duration. FIG. 3 illustrates a general timing diagram of the signals required to produce the injector actuation sampling of the present invention. The timing diagram represents a full and complete description of the signals necessary to perform the sampling according to the present invention. Those signals can be readily and easily produced by suitable software incorporated in the microcontroller 20. The creation of such software from such timing diagram is known and would be a mechanical step to those skilled in the art.

Referring to FIG. 3, a camshaft speed/timing signal 110 is produced by the camshaft speed/timing sensor 56. Based upon a reference point 112 of the camshaft speed/timing signal 110, the microcontroller 20 calculates the time at which the corresponding piston will be at the top dead center of its stroke 113. As shown in the figure, the reference point 112 in the preferred embodiment is a rising edge 111 of the camshaft speed/timing signal 110. The microcontroller 20 then calculates a start of inject time 117 at which fuel should begin to be injected into the cylinder. The controller 20 issues a driver signal 116 over a connector 30 to the unit injector 25. As can be seen in the figure, the driver signal 116 is applied to the particular unit injector 25 at a predetermined length of time prior to the start of inject time 117. This is because there is a delay between applying the driver signal 116 to the unit injector 25 and the time when the unit injector 25 starts to inject 117 fuel.

A greater amount of current is required to initially open the unit injector 25 than is required to hold the injector 25 in the open position. Thus, the driver signal 116 has two tiers 118a,b. The first tier 118a represents the higher level current necessary initially to open the unit injector 25. The second tier 118b represents the current necessary to hold the unit injector 25 open. As shown in the figure, the start of inject time 117 coincides with the reduction in current of the driver signal 116 to the level of the second tier 118b. That figure simply shows an exemplary start of inject 117 time. The start of inject 117 does not depend on the reduction in current of the driver signal 116, but instead is a function of the hydraulic actuation pressure. The start of inject 117 may therefore occur before or after the reduction in current of the driver signal 116.

As shown in FIG. 3, the microcontroller 20 samples the injector actuation pressure sensor 95 at the point 119, which is approximately the same time it begins to send the driver signal 116 to the unit injector 25. After sensing the injector actuation pressure sensor 95, the microcontroller 20 recalculates the injection duration based on the sensed hydraulic actuator pressure.

As noted above, the transient pressure wave is caused by the firing of the individual unit injectors 25. By measuring the hydraulic actuator fluid pressure at approximately the start of each driver signal 116, the microcontroller 20 insures that it samples at approximately the same frequency as the transient pressure wave. Because the microcontroller 20 samples at the same frequency as the transient pressure wave it will measure at approximately the same point of each cycle. By sampling at the time when the microcontroller 20 issues the driver signal 116, the sampled valve will be approximately at the peak 155 of the transient pressure wave, as shown in FIG. 2.

Any decrease between the measured pressure of the hydraulic actuator fluid and the actual pressure over the duration of the injection cycle can be predicted and taken into consideration when the microcontroller 20 calculates the duration of the driver signal 116. In this manner, the present invention can approximate the results of a system that samples at a much faster rate. The microcontroller 20 in many systems does not have the capacity to sample fast enough to reproduce the transient signal accurately. The present invention allows the to sample the pressure at regular intervals, based on the frequency at which the unit injectors 25 are fired, and accurately approximate the actual hydraulic actuator pressure without having to increase the sampling rate.

We claim:

1. A hydraulically actuated electronically controlled unit injector fuel system comprising:

a hydraulically actuated electronically controlled fuel injector;

a pressurized hydraulic actuator fluid connected to the hydraulically actuated electronically controlled fuel injector;

an electronic controller electrically connected to the hydraulically actuated electronically controlled fuel injector;

a first sensor associated with the pressurized hydraulic actuator fluid and connected to said electronic controller;

a second sensor associated with an engine parameter and connected to said electronic controller;

wherein said electronic controller produces an injection signal in response to a sensed condition of said engine parameter;

wherein said first sensor associated with the pressurized hydraulic actuator fluid produces a pressure signal; and wherein said electronic controller inputs the pressure signal as a function of the time at which the electronic controller produces an injection signal.

2. A hydraulically actuated electronically controlled unit injector fuel system according to claim 1, including an injector actuation controller connected to said electronic controller.

3. A hydraulically actuated electronically controlled unit injector fuel system according to claim 2, wherein said electronic control inputs the pressure signal substantially concurrently with producing an injection signal.

4. A hydraulically actuated electronically controlled unit injector fuel system according to claim 2, wherein said electronic control inputs the pressure signal after producing an injection signal.

5. A hydraulically actuated electronically controlled unit injector fuel system according to claim 2, wherein said electronic control inputs the pressure signal after producing every injection signal.

6. A hydraulically actuated electronically controlled unit injector fuel system according to claim 2, wherein said engine parameter is selected from the group of camshaft speed/timing, engine crankshaft position, engine coolant temperature, engine exhaust back pressure, air intake manifold pressure, and fuel throttle position.

7. A hydraulically actuated electronically controlled unit injector fuel system according to claim 2, wherein said engine parameter includes a camshaft speed/timing signal.

8. A hydraulically actuated electronically controlled unit injector fuel system according to claim 3, wherein said engine parameter includes a camshaft speed/timing signal.

9. A hydraulically actuated electronically controlled unit injector fuel system according to claim 2, wherein said engine parameter includes an engine crankshaft position signal.

10. A hydraulically actuated electronically controlled unit injector fuel system according to claim 3, wherein said engine parameter includes an engine crankshaft position signal.

11. A method for sensing an oscillation in pressure of the pressurized hydraulic actuator fluid in a hydraulically actuated electronically controlled unit injector fuel system, comprising the steps of:

issuing an injection signal to a hydraulically actuated unit injector; and sensing a hydraulic actuator fluid pressure in response to issuing said injection signal.

12. A method according to claim 11, including the step of sensing an engine parameter and issuing said injection signal in response to a predetermined state of said engine parameter.

13. A method according to claim 12, wherein said step of sensing is performed substantially concurrently with said step of issuing said injection signal.

14. A method according to claim 12, wherein said step of sensing is performed after said step of issuing said injection signal.

15. A method according to claim 12, wherein said step of sensing an engine parameter includes sensing a camshaft speed/timing sensor.

16. A method according to claim 12, wherein said step of sensing an engine parameter includes sensing an engine crankshaft position sensor.

17. A method for sensing an oscillation in pressure of a pressurized hydraulic fluid in a hydraulically actuated electronically controlled unit injector system, comprising the steps of:

sensing an engine parameter;

issuing an injection signal as a function of said step of sensing an engine parameter; and sensing a pressure of a hydraulic actuator fluid at a time that is a function of said step of issuing an injection signal.

18. A method according to claim 17, wherein said step of sensing an engine parameter includes sensing a camshaft speed/timing sensor.

19. A method according to claim 17, wherein said step of sensing an engine parameter includes sensing an engine crankshaft position sensor.

20. A method according to claim 17, wherein said step of sensing a pressure of a hydraulic actuator fluid is performed substantially concurrently with said step of issuing an injection signal.

* * * * *